US008301489B2

(12) United States Patent
Parry

(10) Patent No.: US 8,301,489 B2
(45) Date of Patent: Oct. 30, 2012

(54) CHANGE MANAGEMENT

(75) Inventor: Warren John Parry, Cremorne (AU)

(73) Assignee: CTRE Pty Limited, Sydney (AU)

( * ) Notice: Subject to any disclaimer, the term of this patent is extended or adjusted under 35 U.S.C. 154(b) by 1498 days.

(21) Appl. No.: 11/722,290

(22) PCT Filed: Dec. 20, 2005

(86) PCT No.: PCT/AU2005/001932
§ 371 (c)(1),
(2), (4) Date: Jun. 27, 2007

(87) PCT Pub. No.: WO2006/066330
PCT Pub. Date: Jun. 29, 2006

(65) Prior Publication Data
US 2010/0049595 A1    Feb. 25, 2010

(30) Foreign Application Priority Data

Dec. 21, 2004  (AU) ............................... 2004907256
Sep. 14, 2005  (AU) ............................... 2005905076

(51) Int. Cl.
*H01R 43/00* (2006.01)
(52) U.S. Cl. .................................................. 705/7.38
(58) Field of Classification Search .................. 705/7.38
See application file for complete search history.

(56) References Cited

U.S. PATENT DOCUMENTS
6,556,974 B1    4/2003  D'Alessandro 7,111,008 B2      9/2006  Nomura et al.
2002/0156596 A1* 10/2002  Caruso et al. ................. 702/179
2004/0267605 A1  12/2004  Martin
(Continued)

FOREIGN PATENT DOCUMENTS
JP      2002-207844       4/2002
(Continued)

OTHER PUBLICATIONS

Ross Brown, Cluster Dynamics in Theory and Practice with Application to Scotland, Mar. 2000, European Policies Research Centre, No. 38, http://www.e-innovation.org/stratinc/files/library/34.pdf.*

(Continued)

*Primary Examiner* — Beth V Boswell
*Assistant Examiner* — Kurtis Gills
(74) *Attorney, Agent, or Firm* — King & Spalding

(57) ABSTRACT

A method and system of generating an analytical tool for use in assessing a state of an entity is described. The method comprises retrieving source data relating to a state of a community of which the entity forms a part, the source data resulting from a data collecting and analysis mechanism and the source data relating to at least one variable and the, or each, variable comprising a plurality of drivers; performing cluster analysis on the source data to produce an array of reference data; and organizing the array of reference data into a form to be used in analyzing data collected from the community. An analytical tool for use in assessing the state of an entity is also described and comprises an array of cells, each cell containing a subset of reference data which provides a measure of each driver related to the state of a community of which the entity forms a part, and the positioning of the cells relative to one another being governed by the inter-relationship of the reference data contained in the cells.

27 Claims, 13 Drawing Sheets

U.S. PATENT DOCUMENTS

2005/0086239 A1* 4/2005 Swann et al. .................. 707/100
2008/0010225 A1* 1/2008 Gonsalves et al. .............. 706/11

FOREIGN PATENT DOCUMENTS

| | | |
|---|---|---|
| JP | 2002-140451 | 5/2002 |
| JP | 2002-140490 | 5/2002 |
| JP | 2002-109081 | 7/2002 |
| JP | 2002-278797 | 9/2002 |
| JP | 2002-534744 | 10/2002 |
| JP | 2003-030385 | 1/2003 |
| JP | 2004-030218 | 1/2004 |
| JP | 2004-185347 | 7/2004 |
| JP | 2005202619 | 7/2005 |
| JP | 2005258774 | 11/2005 |
| WO | WO 02/050717 | 6/2002 |

OTHER PUBLICATIONS

Written Opinion mailed Mar. 17, 2006 (4-pgs.).
International Preliminary Report on Patentability (IPRP) mailed Apr. 10, 2007 (5-pgs.).
International Search Report mailed Mar. 17, 2006 (3-pgs.).
Notification of Reasons for Refusal, Japanese Office Action in corresponding Japanese Patent Application No. 2007-547090, Feb. 1, 2011.

* cited by examiner

CHANGE MANAGEMENT

CROSS REFERENCE TO RELATED APPLICATIONS

This is the National Stage filed under 35 U.S.C. §371 of International Application PCT/AU2005/001932 filed on Dec. 20, 2005, which designated the United States of America, the disclosure of which is incorporated herein by reference.

TECHNICAL FIELD

This invention relates to the assessment of an entity. More particularly, the invention relates to a method of, and a system for, generating an analytical tool, to an analytical tool and to a method of, and a system of, assessing the state of an entity.

BACKGROUND ART

Traditional measurement tools, such as surveys, are limited in their ability to assess the state of an entity. The tools that are commonly used are 'static' in that they measure a number of variables relating to one aspect of an entity, for example, people's attitudes, behaviours or actions at a single point in time. Reports provided using traditional measurement tools typically show averaged scoring related to each dimension measured. Several variables are often grouped by averaging single variables to form a larger composite variable. This is carried out to simplify complexity and to make sense of the data.

While such tools can provide limited assessment of certain aspects of the entity, these tools become unreliable and difficult to use when assessing more complex interactions between variables and when used to assess the impact that change has on the state of the entity. Where statistical analysis is used to establish links between people's behaviour, change that takes place in the entity and organisational performance outcomes it often leads to inconclusive results. Gross assumptions need to be made in relation to what influences the entity's performance. Good quality data is difficult to obtain and the analysis generally does not take into account the impact of multidimensional variables on performance outcomes nor does the analysis adequately allow for the impact of moderating variables that change the state of the entity. The work is time consuming and provides little practical value for the manager responsible for managing change and achieving business outcomes.

Therefore using traditional tools it is difficult to establish links to performance outcomes and it is not possible to model the impact of change on the entity adequately. In the absence of tools to clearly understand, measure and manage variables associated with the entity, such entities continue to be guided by poor information.

DISCLOSURE OF INVENTION

According to a first aspect of the invention, there is provided a method of generating an analytical tool for use in assessing a state of an entity, the method comprising:

retrieving source data relating to a state of a community of which the entity forms a part, the source data resulting from a data collecting and analysis mechanism and the source data relating to at least one variable and the, or each, variable comprising a plurality of drivers;

performing cluster analysis on the source data to produce an array of reference data; and organising the array of reference data into a form to be used in analysing data collected from the community.

According to a second aspect of the invention, there is provided a system for generating an analytical tool for use in assessing a state of an entity, the system comprising:

a database containing source data relating to a state of a community of which the entity forms a part, the source data resulting from a data collecting and analysis mechanism and the source data relating to at least one variable and the, or each, variable comprising a plurality of drivers;

an analysis engine for performing, cluster analysis on the source data to produce an array of reference data; and a data analysis and organisation mechanism for analysing, organising and structuring the reference data into a form to be used in analysing data collected from the community.

According to a third aspect of the invention, there is provided an analytical tool for use in assessing the state of an entity, the analytical tool comprising an array of cells, each cell containing a subset of reference data, the reference data within each cell providing a measure of each driver related to the state of a community of which the entity forms a part and the positioning of the cells relative to one another being governed by the inter-relationship of the reference data contained in the cells.

According to a fourth aspect of the invention, there is provided a method of assessing a state of an entity, the method comprising:

generating entity data for the entity to be analysed, the entity data including at least one variable applicable to the entity and the at least one variable comprising a plurality of drivers;

inputting the entity data into an analytical tool, as described above; and generating output data from the analytical tool to be used in analysing the entity.

According to a fifth aspect of the invention, there is provided a system for assessing a state of an entity, the system comprising:

a data generator for generating entity data for the entity to be analysed, the entity data including at least one variable applicable to the entity and the at least one variable comprising a plurality of drivers;

an analytical tool, as described above, into which the entity data is input; and an output data set produced from the analytical tool, the output data set being used in an analysis of the entity.

The data collecting and analysis mechanism may comprise a series of questions tailored to be answered in a predetermined manner. For example, the series of questions may comprise multiple choice questions where each choice relates to a grade of answer. The data collecting and analysis mechanism may further involve a processor for processing the answers to the questions and importing the resultant information into analysis files. Thus, the database may comprise the analysis files.

The form of cluster analysis used may be multivariate dimension reduction. More particularly, the multivariate dimension reduction may use a self organising map algorithm (SOM).

The entity may be an organisation.

The source data relating to the state of the community may be sourced from one or more organisations with a variety of organisations, such as industries, being represented.

The, or each, variable may include, but not be limited to, performance success factors, change and people factors.

A non-exhaustive list of drivers relating to performance success factors may include: an organisation's effectiveness, competitive position, customer service, ability to deliver innovation, cooperation synergy, morale, and under or over budget. A non-exhaustive list of drivers relating to change may include: an organisation's growth, restructure, impact of marketplace conditions, and levels of resources, extent of training received and pace and stage of change. A non-exhaustive list of drivers relating to people factors may include: an organisation's aligned direction, engagement, leadership and learning and emotional energy.

Each of these drivers may have sub-drivers. For example, aligned direction may have sub-drivers including communication and vision direction. Engagement may have sub-drivers including change leadership and involvement. Leadership and learning may have sub-drivers including team leadership, feeling valued and accountability. Emotional energy may have sub-drivers including the extent of passion/drive and the extent of disturbance/damage.

Optionally, the, or each, variable may include, but not be limited to, improving business performance and/or achieving project objectives.

A non-exhaustive list of drivers for these variables may include: the extent of turbulence within an organisation, the extent of resources within an organisation, aligned direction, engagement, team leadership and emotional energy.

Each of these drivers may have sub-drivers. For example turbulence may have sub-drivers including the risks and roadblocks present within an organisation, and what changes are taking place. The sub-drivers of resources may include training and capability, systems and processes and project support. Aligned direction may have sub-drivers including communication and vision/direction. Engagement may have sub-drivers including change leadership and involvement. Team Leadership may have sub-drivers including management skills, feeling valued and accountability. Emotional energy may have sub-drivers including the extent of passion/drive and the extent of disturbance/damage.

Under each sub-driver may be one or more behaviours and/or measures. For example, the sub-driver for disturbance/damage may have a non-exhaustive list of behaviours/measures including anger, damage, distress and fear.

The analytical tool may be implemented as a two dimensional matrix of reference data. In addition, or instead, the analytical tool may be a two dimensional representation of a three dimensional mapping. For the sake of brevity, the two dimensional representation of a three dimensional mapping will be referred to below as a "3d mapping". The reference data may be three dimensionally modelled to provide the 3d mapping.

The output data set may be compared with the reference data and the result may be used to assess and manage change in the entity. More particularly, the output data set may be used to show how changing a driver may affect the entity. Thus, using the output data set, a developmental model may be implemented which can be used to determine how change and/or actions within the entity will affect the entity. The developmental model can also be used to improve the performance of the entity and to determine how best to achieve the higher performance.

The output data set may therefore provide the basis for output reporting which may include change modelling, dynamic benchmarking, performance mapping/change mapping, path optimisation, individual reporting, positioning of objectives and obstacles, positioning of individuals and teams within an organisation and culture mapping.

Dynamic benchmarking may comprise normalising the entity data relative to the array of output data and using the normalised data to formulate dynamic benchmarks.

Path optimisation may comprise outlining a sequence of actions for at least a subset of the entity to reach a higher level of performance. The subset may be an individual or team, workgroup or business unit within the entity.

The reports may be provided in any form. For instance reports may be provided over the Internet or on a computer readable medium, such as CD-ROM.

BRIEF DESCRIPTION OF DRAWINGS

Embodiments of the invention are now described by way of example with reference to the accompanying drawings in which:

FIG. 5 shows a sample of a part of a questionnaire used in the collecting of source data for a system, in accordance with an embodiment of another aspect of the invention, for generating an analytical tool;

FIG. 6 shows a non-exhaustive list of questions that could be asked to collect the source data;

DETAILED DESCRIPTION OF EXEMPLARY EMBODIMENTS

Figure 1:
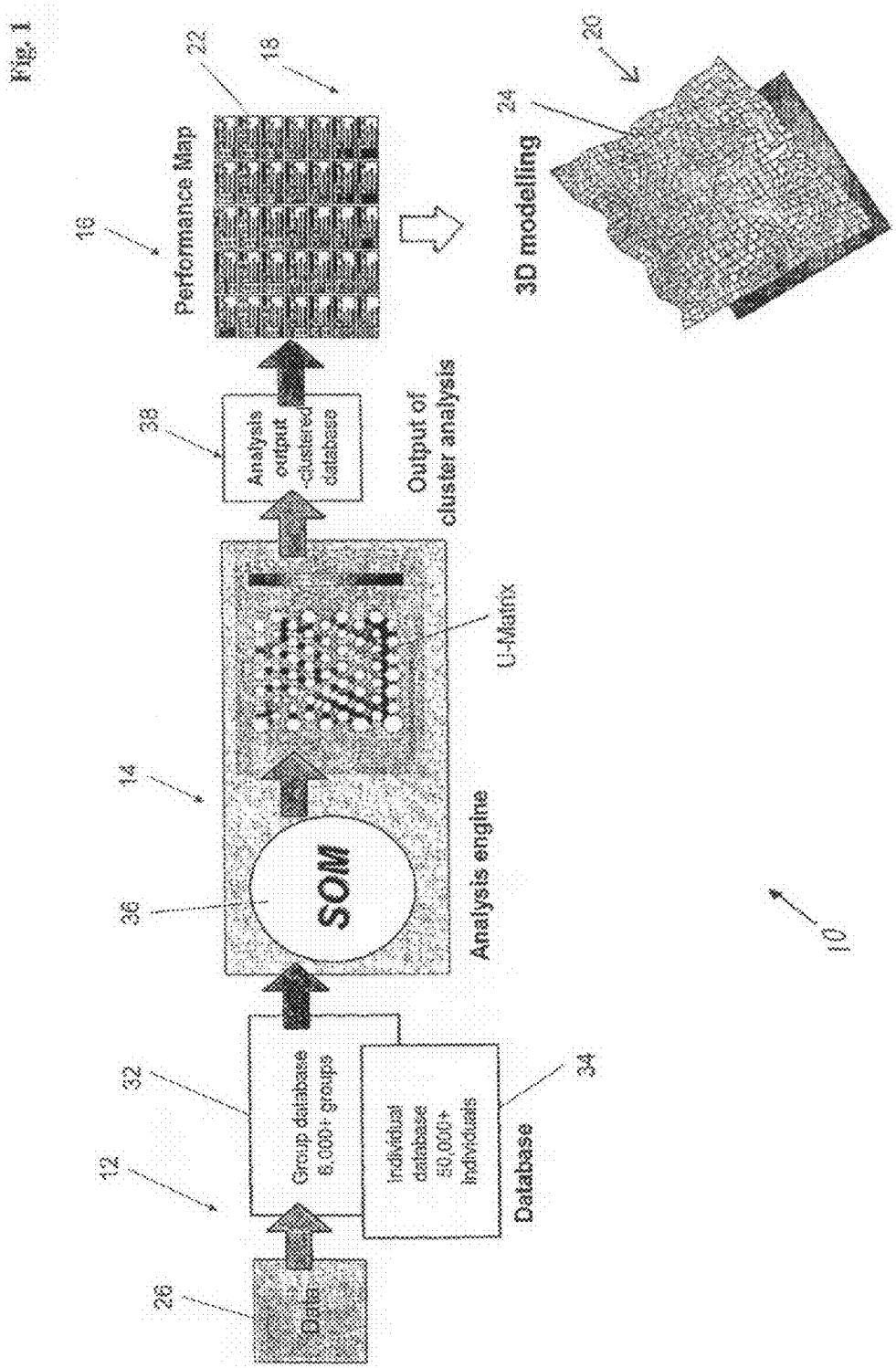
FIG. 1 shows a system diagram of a system, in accordance with an embodiment of one aspect of the invention, for assessing a state of an entity.

In FIGS. 1-4 of the drawings, reference numeral 10 generally designates a system, in accordance with an embodiment of one aspect of the invention, for assessing a state of an entity. More particularly, the system 10 is intended for use in managing change in an entity such as a business organisation. For ease of reference, the invention will be described with reference to its application to managing change in a business environment such as in a company.

The system 10 includes a database 12 to store source data relating to a state of a reference community comprising a population of business organisations and a population of individuals. The system 10 further includes an analysis engine 14 for performing cluster analysis on source data from the database 12 to produce an analytical tool or master performance map 16 (otherwise referred to as a change map). An output of the analysis engine 14 provides a clustered database of an array of raw data 38. This array of raw data is organised and interpreted using a change tracking model 40 (FIG. 2) to provide the master performance map 16. The master performance map 16 comprises a two dimensional array, or performance map, 18 and a 3d mapping 20, as will be described in greater detail below. The performance map 18 and the 3d mapping 20 include a plurality of cells 22 or 24, as the case may be, each containing a subset of the reference data. The reference data within each cell provides measures of drivers related to the state of the reference community, each cell describing a sub-set/sub population of the database 12. The master performance map 16 further describes an inter-relationship between the plurality of drivers.

The master performance map 16 provides a template of all possible change tracking clusters on the path between high and low performance given the number of cells specified in the matrix. The state of a specific entity (i.e. a specific client group or groups) can be assessed by locating and positioning that specific client group on the master performance map, as will be described in greater detail below. A specific client group is located on the master performance map 16 by finding the cell that has the closest corresponding match of change tracking measures to that specific client group.

Figure 2:
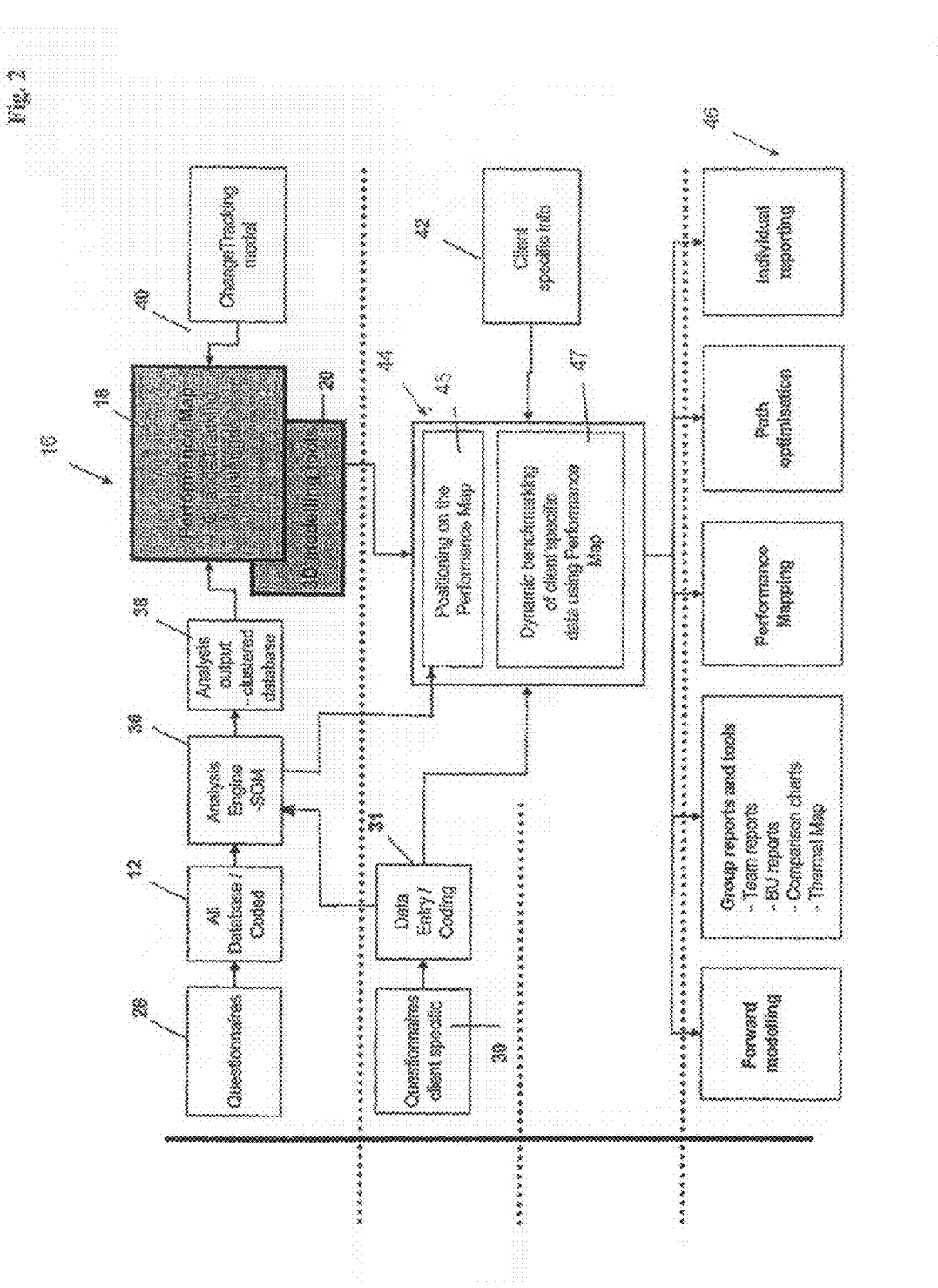
FIG. 2 shows a flowchart of the system.

Prior to use of the system 10 and referring more particularly to FIGS. 1 and 2 of the drawings, source data 26 is collected to generate the master performance map 16, in accordance with an embodiment of an aspect of the invention. The source data 26 is typically collected via questionnaires 28. It may also include other data obtained from the entity—for example financial data.

The source data 26 is general data collected by an external consultant from a population of organisations of which the entity forms a part. Thus, for example, in the business community, the source data 26 includes data relating either to businesses in general or businesses of a particular type. This source data is collected over a period of time and forms the database 12 of the system 10.

Figure 5:
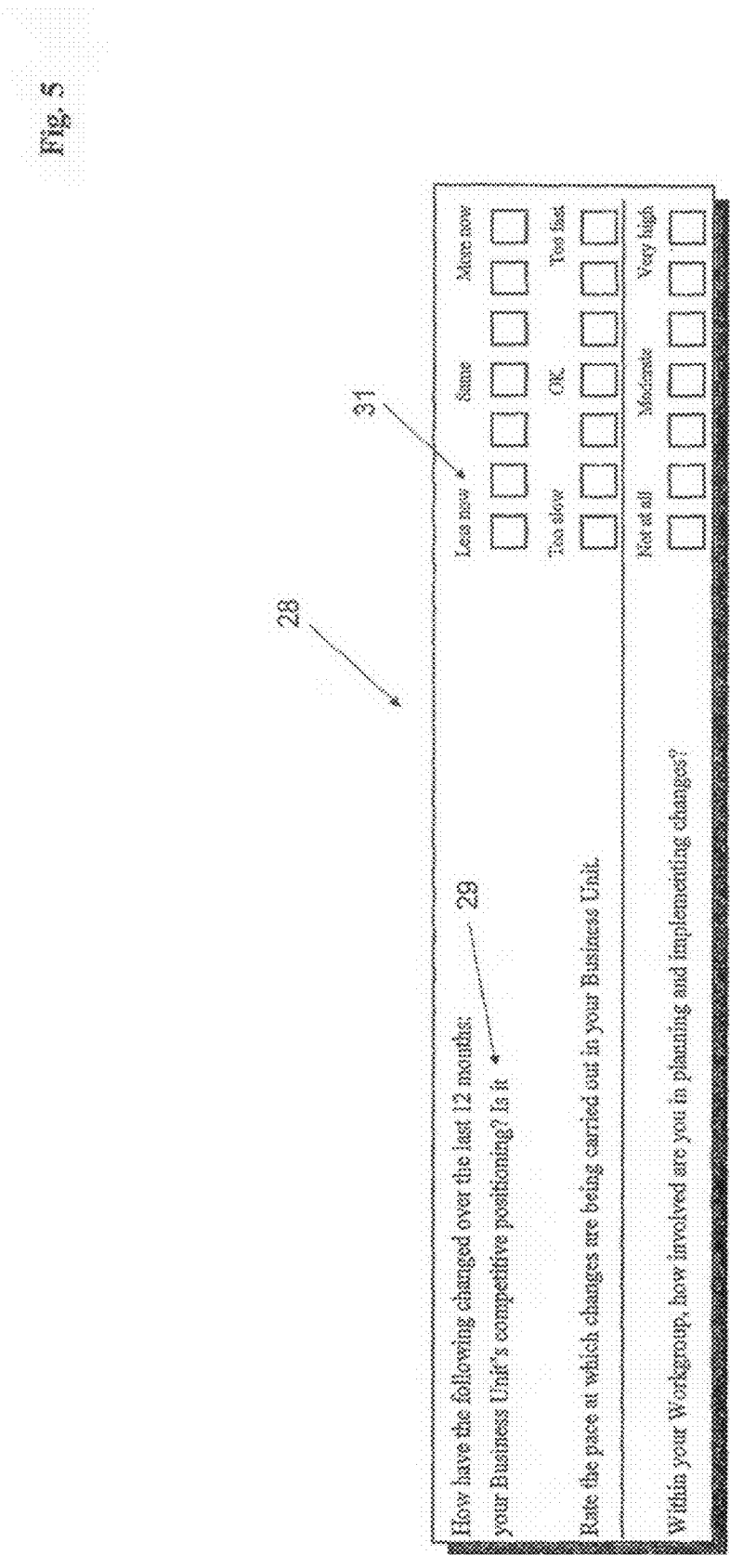

A sample of a part of a questionnaire 28 is shown in FIG. 5 of the drawings. The sample shows questions 29 to each of which there are a grade of responses as shown at 31. Once the completed questionnaires have been collected, the completed questionnaires are subjected to data analysis. The data collecting and analysis forms part of a data analysis and organisation mechanism (referred to below as a "change tracking mode"). The change tracking model is shown at 40 in FIG. 2 of the drawings.

Figure 6:
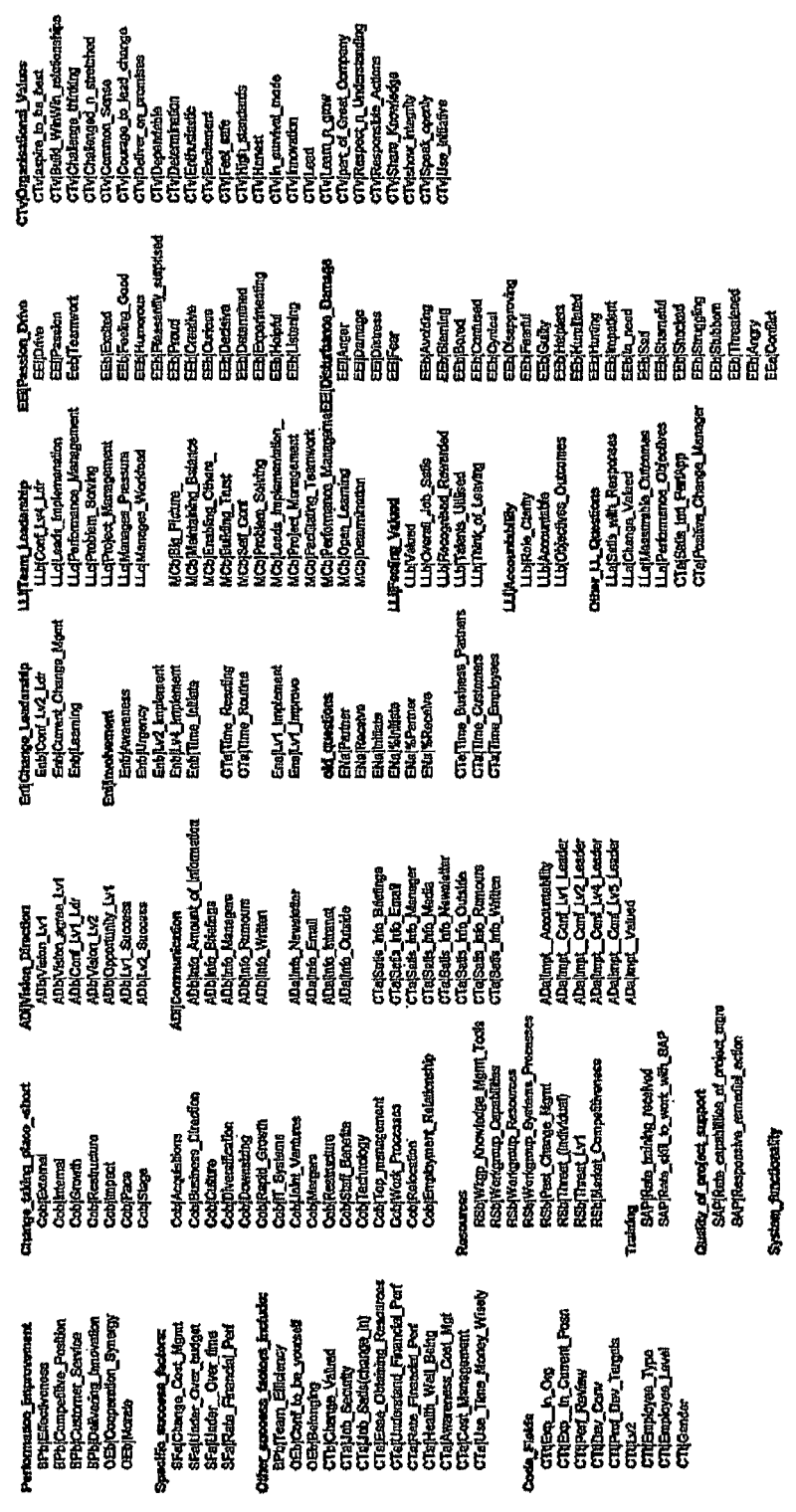

FIG. 6 shows a non-exhaustive list of the type of questions to be asked in various categories. All the questions are asked in the form shown in FIG. 5 of the drawings so that a response is a graded response.

It is to be noted that the database 12 has various subdivisions including a group database 32 (FIG. 1) relating to responses from the population of organisations and an individuals database 34 relating to responses from the population of individuals.

Figure 7:
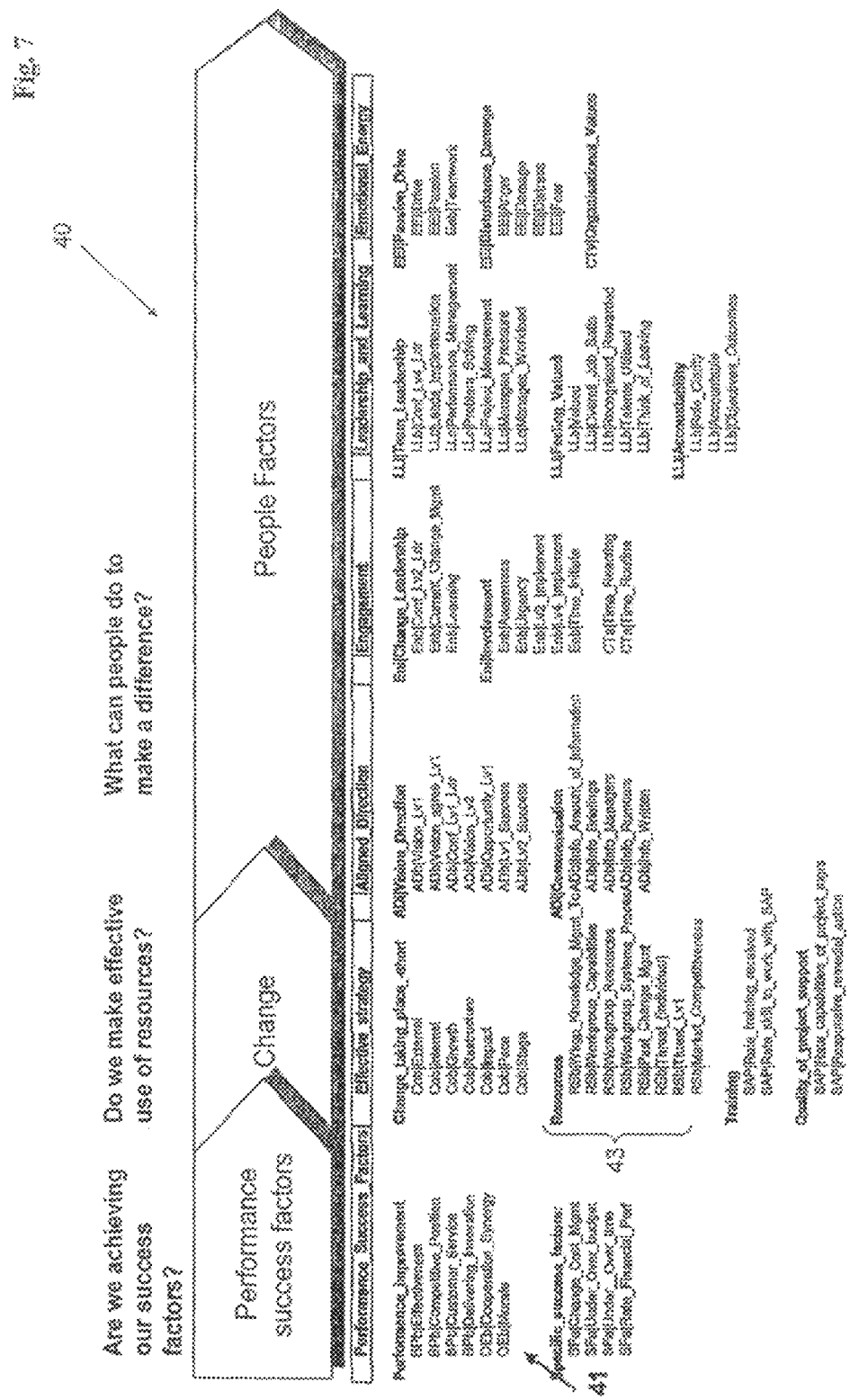
FIG. 7 shows an output from a data collecting and analysis mechanism for use in the system of FIG. 1.

The change tracking model 40 is shown in FIG. 7 of the drawings. The change tracking model 40 is generated in response to questions relating to three different variables being performance success factors, change and people. In respect of certain of the drivers, the variables are grouped into clusters 43.

It is also to be noted that all three variables have sub-variables—for example the people factor variable has certain sub-variables; more particularly, "aligned direction", "engagement", "leadership and learning" and "emotional energy".

The change tracking model 40 massages the response collected into a form suitable for analysis and is imported into analysis files for investigation.

It is to be noted that each variable in the change tracking model 40 is in the form of a legend such as, for example, "ADb|VisionLv1". The first two letters represent the variable, the third letter represent a behaviour within the variable and the remainder of the legend relates to the driver in question.

Thus, the change tracking model 40 is obtained through statistical analysis of the database. It provides a way of being able to explain and interpret various dimensions of total data collected in a consistent manner.

In the system for generating the master performance map 16, the output from the database 12 is fed to the analysis engine 14.

The analysis engine 14 uses pattern recognition. In a preferred embodiment, the analysis engine 14 makes use of multivariate dimension reduction in the form of a self-organising map algorithm (SOM) 36. The SOM 36 is an algorithm used to visualise and interpret high-dimensional data sets. Typical applications of SOMs are visualisations of processed states or financial results by representing dependencies within the data on a map. The data is produced in the form of U-Matrix which is in the form of a grid of processing units or nodes. A model of some multidimensional observation is associated with each processing unit. The U-Matrix is representative of all available observations with the highest possible accuracy using a restricted set of models. The models become ordered on the grid so that similar models are close to each other and dissimilar models are far from each other.

When it is desired to use the master performance map 16 in analysing or assessing the state of an entity, client specific questionnaires 30 are generated in the same format as the questionnaires 28. The invention also facilitates the use of a reduced number of questions to be asked, for example, 15 to 25 questions instead of 50 questions to locate the cell on the master performance map 16 and reference the broader data in that cell. In addition, client specific information 42 is collected. The client specific questionnaires 30 are subjected to data entry/coding as shown at 31 to provide the format of data described above with reference to the change tracking model 40.

The output from the coding 31 and data collected from client specific information as shown at 42 is compared with the reference data in the performance map 16 to produce a client specific output data 44 that is then used in producing change tracking reports and change tracking tools 46 (FIG. 2).

The client specific output data set 44 contains two different elements—positioning coordinates 45 on the performance map 16 and data configured on the basis of dynamic benchmarks 47.

A specific client group is located on the master performance map 16 by finding the cell that has the closest corresponding match of change tracking measures to that specific client group. Each cell on the performance map has a unique algorithm of around 50 numbers. SOM analysis allows the group to be located on a grid according to the group's overall change tracking score taking into account not only the performance of the group but also change driver scores, conditions and resources. In order to locate on which cell of the performance map 16 the group is to be placed, the data 31 is fed through the SOM 36 again and the output from the SOM 36 is compared with the grid positions to position the group on the performance map 16.

Dynamic benchmarking is the process of configuring, or normalising, client specific data against the benchmarks for high (improving performance), low (declining performance) and same performance or driver norm in the master performance map 16. Dynamic benchmarking involves identifying the most appropriate performance measures for the organization. This involves using one or a combination of the performance success factor measures in the change tracking model 40.

In the performance map 18 and the 3d mapping 20 of the performance map 16, the SOM 36 arranges individuals and groups according to the similarity of their scoring. Characteristically individuals and groups that score high on performance success factors (high performance) and those groups that are low scoring on performance success factors (low performance) are located in opposing corners. These areas on the performance map 16 define the top 10% of performance and the bottom 10% of performance.

Figure 4:
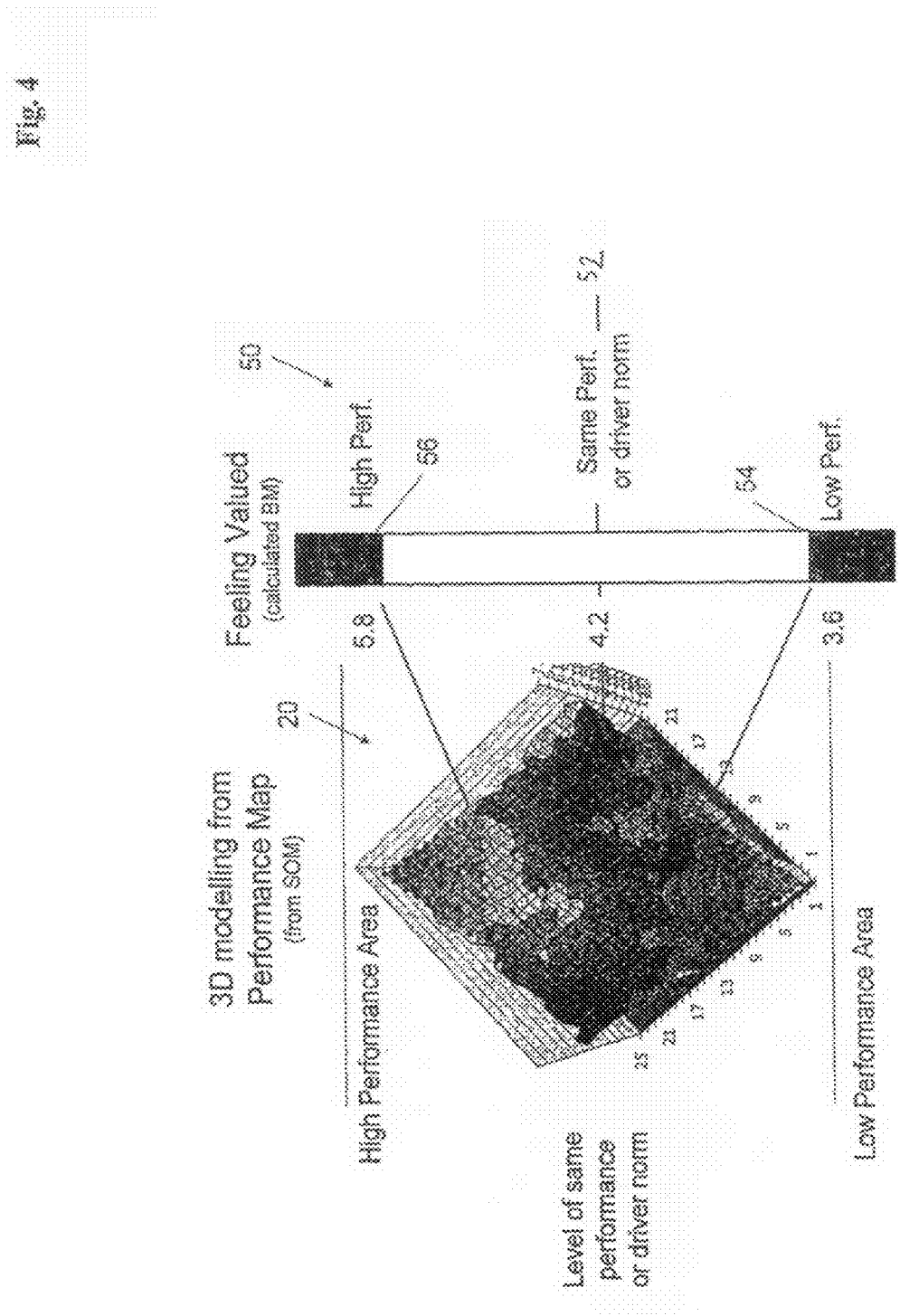
FIG. 4 shows an example of benchmarking using a 3d mapping output by the system.

In FIG. 4 of the drawings, the example shown is for the driver of "feeling valued" for an individual or a group within the organisation. Using a group within the organisation as an example, the group's driver of "feeling valued" can be assessed to provide an indication of how that group's level of feeling valued rates with respect to high performance and low performance as defined on the master performance map 16. Comparisons can also be made against other groups within the organisation or similar groups in other organisations. In FIG. 4 of the drawings, the 3d mapping 20 is manipulated to provide a normalised output 50. The normalised output 50 is in the form of a bar graph having a normalised point of same performance or driver norm 52 centrally located between a low performance benchmark 54, and a high performance benchmark 56. The benchmark for high performance is determined by taking the average of the top 10% of cells on the performance map 16 according to the performance success factor as defined by the change tracking model 40. The benchmark for low performance is determined by taking the average of the bottom 10% of cells on the performance map according to the performance success factor as defined by the change tracking model. The benchmark 52 for same performance is determined by taking the average of the cells scoring same or mid range according to the performance success factor as defined by the change tracking model 40. The benchmark 52 for driver norm, is determined by taking the average of the driver scores as defined by the change tracking model 40.

These areas that define high, low and same performance can further be adjusted taking into account other variables such as, for example, employee level in the organisation, amount of resources, amount of change taking place.

Groups can be labelled as being in low performance, off track, unsustainable, unfocused, on track or in high performance. On the 3d mapping 20—groups can be located in different areas in moving from low performance to high performance. Off track is defined as declining performance and below driver norm. Unsustainable is defined as improving performance and below the norm on driver strength. Unfocused is defined as above norm diver average and declining performance. On track is defined as improving performance and above average driver norm. High performance is a sub set of on track as previously defined above. Low performance is a sub set of off track as previously defined outlined above.

By using the high performance area of the 3d mapping 20 or the two dimensional map 18, variables can be identified which are not in high performance and the required path to move the group across into high performance can be determined.

In other words, dynamic benchmarking reports are used to provide performance benchmarks and give work groups at all levels a structured process for feedback and action planning using the two dimensional map 18 and/or the 3d mapping 20.

The output data 44 is correlated with the client specific information 42 to provide outputs in the form of change tracking reports 46. The change tracking reports 46 include reports on change, or forward, modelling, group reports and tools, performance mapping, path optimisation and individual reports. The group reports and tools include thermal maps that identify hot spots across the organisation allowing interventions to be formulated based on facts, and target actions to be carried out.

The change modelling reports are tools used for testing assumptions, forward modelling and assessing decisions. The change modelling reports allow positioning and movement around the entity being assessed.

Figure 3:
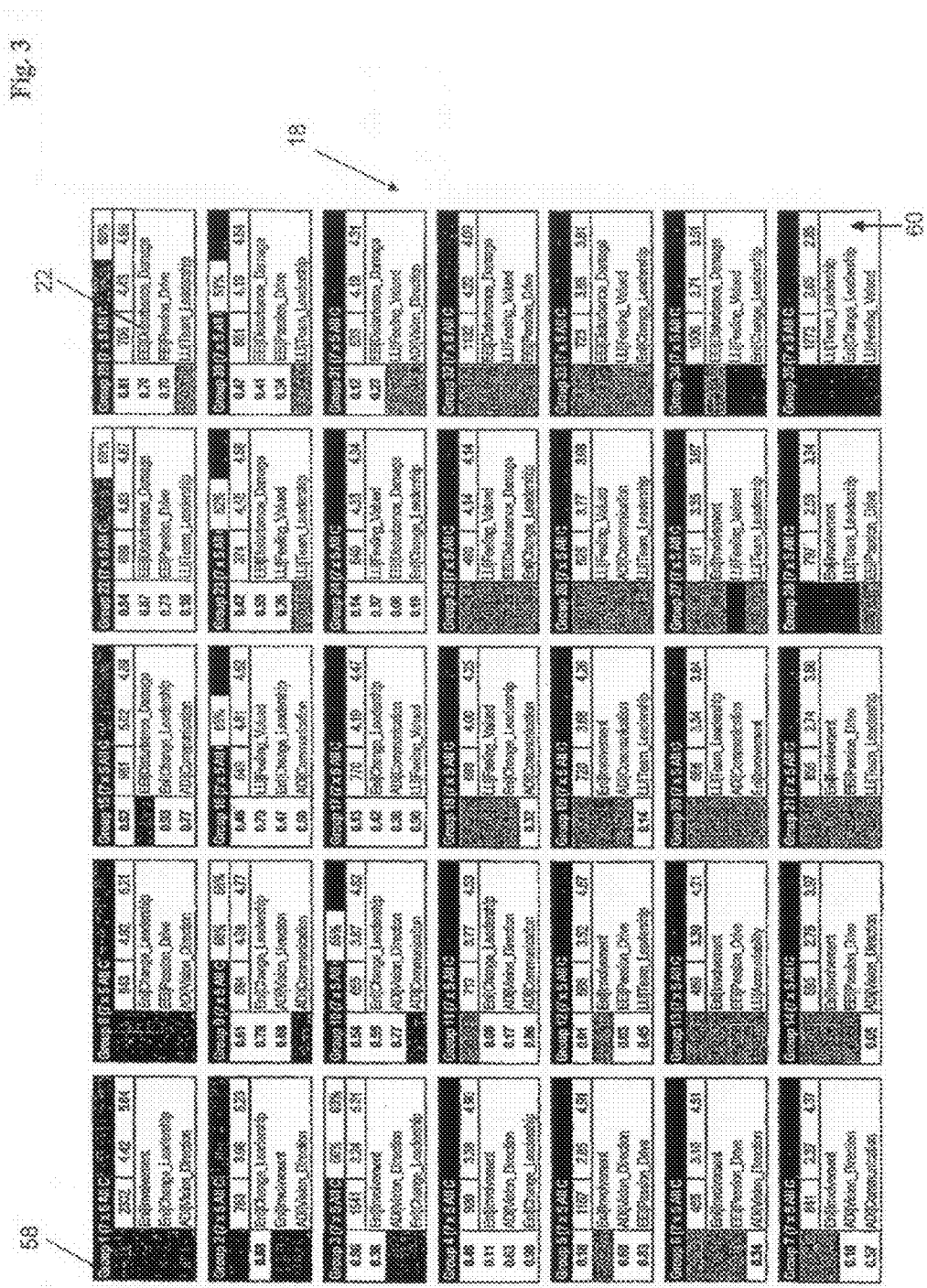
FIG. 3 shows an example of a two dimensional map of output data of the system.

The performance map 18 is, as indicated, made up of a plurality of cells 22. The cells 22 contain the reference data. The performance map 18 is a matrix where a left, top corner 58 of the matrix shows a high performance area and a right, bottom corner 60 shows a low performance area. While the matrix can have any desired configuration, the matrix presently used is a 25×25 matrix. What is illustrated in FIG. 3 of the drawings is a sample portion of the 25×25 matrix.

Each cell 22 has coordinates for the variables of performance success factors, change and people and the matrix shows the complex interrelationship between the variables. Each cell 22 contains a unique set of data for all the questions asked in the specific entity being assessed. The information in each cell 22 includes an identifier of the group of the entity, data relating to each of the variables, data relating to predetermined drivers of the variables and those drivers constituting important issues for one reason or another for that group. The data relating to the drivers constituting important issues in each cell is also in the form of the legend used in the change tracking model 40, for example, "ADb|VisionLv1".

Performance Mapping is the technique used to generate a hypotheses about the linkages between work group dynamics as they are assessed using change tracking measures and other performance outcomes. Examples of the latter include cost ratios, OH& S incident data, sales figures, profit figures etc.).

Performance Mapping is carried out by first positioning a number of specific client groups on the master performance map 16. Performance data (non-change tracking data—eg costs, profit, sales figures) specific to each group on the performance map 16, is overlain as a parallel 3d plane. Visual observation of associations/or relationships between the two parallel planes is used to generate a hypothesis about the linkages between change tracking dynamics and performance outcomes. Because change tracking measures/dynamics and performance outcomes are being mapped measures in the same frame of reference, associations and linkages between the two can be quickly found. For example—in a specific company all work groups with over-budget cost performance may be located down the left hand side of the performance map. Work groups with under-budget cost performance may be located in the top centre of the performance map. Examining the differences between the change tracking measures in areas of the performance map associated with under-budget and over-budget cost leads to conclusions about the variables that impact or influence cost outcomes. Statistical techniques are used to confirm the significance of the differences. Using similar techniques, changes across time can be modelled to identify lead and lag indicators.

The path optimisation report uses sequential actions to find the quickest, easiest and most sustainable route to move from a low performance area to a high performance area.

Then, by using the path optimisation report, the organisation can determine how, for example, a work group can progress to a high performance benchmark 56. Using the 3d mapping 20, the quickest, easiest or most sustainable path to the high performance benchmark 56 can be determined. It is to be noted that this need not necessarily be the shortest path. A "high performance" area can be defined as any number of success factors or a combination of cost management, customer service improvement, innovation, effectiveness, cooperation and synergy between areas and morale.

If the work group occupies a point in the low performance area of the 3d mapping 20, the path optimisation report shows the actions needed to move the team towards the high performance area By calculating from the change tracking data in the cells on the master performance map 16 (based on SOM analysis profiles) around the group, it can be ascertained what variables should be focussed on in order to enable the group to move to the high performance area. This can be achieved by way of a sequential process where the work group implements a series of actions to follow the necessary path to move into the high performance area.

|  | CT1 | CT2 | CHANGE |
|---|---|---|---|
| Aligned Direction | −0.06 | 0.08 | 0.14 |
| Engagement | −0.49 | 0.25 | 0.74 |
| Leadership and Learning | 0.41 | 0.34 | −0.07 |
| Emotional Energy | 0.88 | 0.97 | 0.09 |
| Business Performance | 4.52 | 4.62 | 0.10 |
| Conditions | 4.01 | 4.67 | 0.66 |
| Resources | 5.21 | 5.25 | 0.04 |

The table above is an example of a path optimisation report for a team. This path optimisation report shows that the team performance figures are adequate but it has a low engagement level in CT1. The team had a big rise in "Engagement" and in "Change Conditions" moving the team closer to high performance. The team's "Emotional Energy" driver is near a high performance level. "Engagement" and "Leadership and Learning" drivers are above the norm but the "Aligned Direction" driver is only just above the norm.

Making the assumption that "Change Conditions" and "Resources" drivers remain stable, to move to a higher performance, the team scores indicate that the team needs to align with the organisation's vision and direction and to increase involvement of individuals within the team.

Individual reports allow specific feedback to be given to individuals who complete questionnaires. This feedback provides them with a comparison of their individual scores against the scores for their team as a whole. Thus, the individual reports provide immediate feedback to individuals about how their attitudes and behaviours can impact on performance success factors.

When the system 10 is to be implemented, a system 10 dedicated to that particular organisation is designed by clarifying measures to track change success, engage leadership teams in the planning process and setting up a change agent network. In this initial step, external consultants work with leaders of the organisation to clarify directives and define basic specifications for the particular change that is required. The questionnaires are tailored to the particular organisation's requirements including the addition of any customised questions. Decisions are made about when to use paper versus web based data collection. Web group structures are identified, communications prepared and managers of the organisation are briefed.

In a data collection step in the implementation of the system 10, the questionnaires 30 are distributed within the organisation. Where possible, web-based distribution of the questionnaires 30 and collection of the completed questionnaires 30 is used with employees contacted by e-mail to start the process. Questionnaire completion is monitored by the consultants with alerts sent to employees and managers for follow up. Where paper questionnaires are used, they are printed and distributed. Data from the completed questionnaires is entered in the databases 32 and 34. The consultants monitor the entry of the data and managers of the organisation are updated on completion rates so that the necessary follow-up action can be taken.

The following step is the analysis step using client specific data 31 and 42 to produce the output data set 44. The first step in the analysis is to assess generally where the organisation, or a group within the organisation, is located relative to the community. A specific client group is located on the master performance map 16 by finding the cell that has the closest corresponding match of change tracking measures to that specific client group. As indicated above, each cell on the master performance map 16 has a unique algorithm of around 50 numbers and the client specific data 31 is again run through the SOM 36 to determine the position of the group on the master performance map 18.

The second step of the analysis involves dynamic benchmarking of the specific client data. Dynamic benchmarking is carried out by configuring, or normalising, the client specific data against the benchmarks for high, low and same performance or driver norm in the master performance map 16 as described above.

The change tracking reports 44 are issued which enable managers, at all levels, to know how they are tracking. The managers are therefore provided with practical, actionable information while issues are still fresh. It enables managers to assess whether or not the change strategy of the organisation and use of their resources is effective and whether or not performance success factors are being achieved. In the analysis section, reports can be provided for groups of people within the organisation. These reports identify and prioritise issues (shown in the cells 22 of the performance map 18 within groups and highlight actions to be taken. The reports can be disseminated electronically or on computer readable medium such as on a CD-Rom. The reports are in pictogram form so that they are quickly understood and the information rapidly absorbed.

The system 10 is then used to implement various actions. In this step, leaders at all levels of the organisation participate in feedback sessions to review and discuss reports and decide on actions to address issues that are putting change at risk. With the organisation's consultants assisting, difficult issues can be confronted and action plans can be built which result in improved performance.

At the strategic level, the external consultants lead discussions with senior management as well as division and functional managers to develop the most appropriate strategies. Feedback to the organisation is done with the help of an internal network of resources who facilitate the feedback, review and action planning sessions. In this way, units within the organisation are able to conduct their own feedback sessions in a properly facilitated manner.

During the feedback and planning sessions at all levels within the organisation, action plans are developed for review and sign-off by management. Action plans are reported in a common format for easy review and evaluation. When the next change tracking cycle is commenced, typically within about six months, the impact of the actions can be discerned and refined and revised as necessary.

It is an advantage of the invention that the system 10 is used to assist organisations in managing change. It allows people at all levels of an organisation to take steps needed to achieve high performance and allows leaders of the organisation to develop effective change strategies. Thus, data is collected from people within the organisation and is compared with performance benchmarks from research, as contained in the databases 32 and 34, and provides feedback to show how change is progressing. It also allows groups at all levels within an organisation to review, plan and act on the feedback and provides guidance and builds skills to keep change on track.

Use of the system 10 also enables executives within the organisation to identify potential trouble spots arising from change and to initiate appropriate corrective action.

It is a further advantage of the invention that the system 10 allows teams and business leaders to clarify issues, develop action plans and monitor progress. Web-based collection tools and/or paper questionnaires and easy-to-use reports are used to track and manage change. Data is collected and analysed expeditiously with reports for both strategic decisions and actions at group level. The change tracking reports 44 provide an early warning system allowing potential problems to be resolved before they happen. Further, the change tracking reports assist in building capability as change occurs. Real-time feedback and on-the-job coaching allows effective action to be taken.

In addition, the change tracking reports 44 can be applied individually or in combination as part of a comprehensive change program for the organisation. They provide a structured process for managers and teams at all levels of the organisation to receive benchmarked feedback to initiate action. On-going change tracking reports and cycles allow the impact of various actions to be evaluated with repeated cycles building capabilities across the organisation.

In particular the performance mapping reports can be used to explore the relationships between people, culture and specific dimensions of performance improvements in specific areas such as, for example, cost performance, occupational health and safety incidents, or the like. In this regard, the use of the performance map 16 allows comparisons to be made between comparable levels within an organisation and allows variables to be calculated taking into account all relevant factors.

Figure 8:
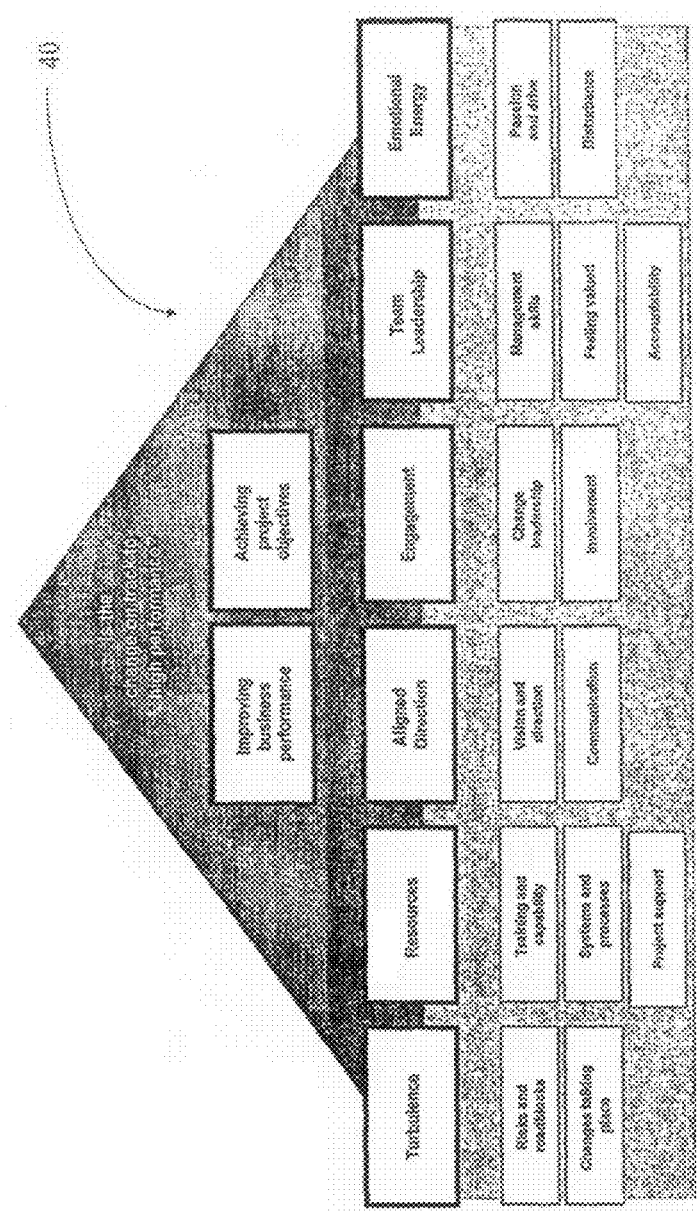
FIG. 8 shows an alternative output from a data collecting and analysis mechanism for use in the system of FIG. 1.

An alternative form of the change tracking model 40 is shown in FIG. 8 of the drawings. This change tracking model 40 is generated in response to questions relating to two different variables being improving business performance and achieving project objectives. A non exhaustive list of factors associated with improving business performance include improving cost effectiveness, improving customer service and improving cost management. A non exhaustive list of project objectives identifiable by an organisation include increased revenue and sales, improved customer service and customer responsiveness, lower costs, productivity improvements, improved asset utilisation, improved inventory management and reduced working capital, reduced cycle time, schedule and planning improvements, improved safety, improved regulatory compliance and improved product/service quality.

The model 40 includes six drivers, these being the extent of turbulence within an organisation, the extent of resources within an organisation, aligned direction, engagement, team leadership and emotional energy. Each driver includes sub-drivers, for instance, the sub-drivers of turbulence include risks and roadblocks and changes taking place, the latter concerning issues and obstacles which may prevent business benefits being realised.

This form of the model 40 is applicable, in at least one situation, to aid an organisation in deciding whether a current change project will realise business benefits for the organisation. The sub-drivers for risks and roadblocks, for instance, include questions around the level of organisational risk, the level of personal threat and past change management performance. The sub-drivers for changes taking place includes questions around the likely issues and obstacles faced by the change project. Such issues and obstacles include conflicting priorities, lack of agreement amongst stakeholders, lack of top management support, poorly defined objectives, poor resource allocation, poor planning and estimation, lack of training and a shortage of skills, employee's inability to adapt to change, high staff turnover, unclear reporting tools, lack of software functionality, slow roll out of enhancements and upgrades and the existence of multiple vendors or suppliers.

When an organisation wants to assess whether a current change project will realise business benefits for the organisation, client specific questionnaires are generated for individuals and/or groups within the organisation, in order to gauge potential issues and obstacles to the success of the change project. Client specific data is then obtained.

Figure 9:
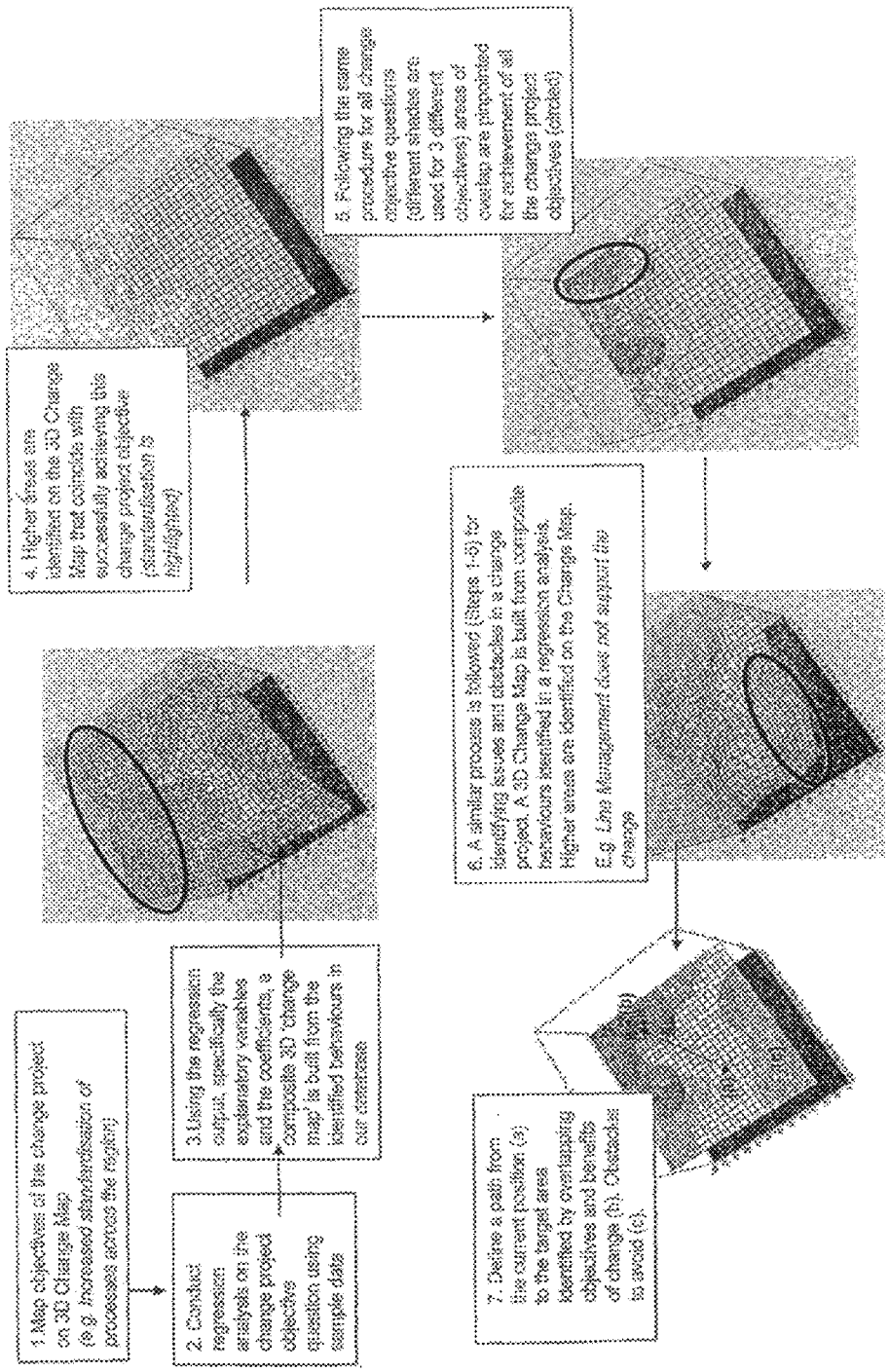
FIG. 9 shows a flow chart of the creation of a 3d model which maps the objectives and obstacles identified by an organisation.

FIG. 9 schematically shows the steps involved in determining whether a current change project will realise business benefits for the organisation and where issues and obstacles are located. From the database 12 and the client specific data, data for each identified project objective and each project issue and obstacle are mapped onto the performance map (step 1), for instance an objective may be to increase standardization of processes across a particular region. A regression analysis on the specific project objective or issues question from the sample data (client or database) is then carried out to determine the explanatory variables (step 2). Using this regression output data, a composite '3D change map' is built from the variables in the database corresponding to the variables and coefficients identified in the regression equation (step 3). This is overlain as a 3d plane representing each objective and each issue and obstacle as well as a combined map showing regions of objectives and regions of issues and obstacles. Higher areas are identified on the 3D change map that coincide with successfully achieving each change project objective, for instance standardisation is highlighted (step 4). Following the same procedure for all change objective questions and marking each objective with a different shade, areas of overlap are able to be pinpointed for achievement of all the change project objectives (step 5) and similarly to achieve avoidance of identified issues and obstacles (step 6). A path is then able to be defined from the organisation's current position (a) to the target area identified by overlapping objectives and benefits of change (b) whilst noting obstacles to avoid (c) (step 7). Thus from the performance map, areas can be identified as successful for achieving the objectives of the current change project and areas in which the group is likely to encounter issues and obstacle which hinder achievement of the objectives. In addition, each individual and/or group is located on the master performance map, as previously described above in relation to FIGS. 1 to 7. When several groups are located on the performance map it can be seen what groups are likely to encounter which particular issues and obstacles and what groups are likely to achieve which particular objectives whilst also showing the level of performance attained.

As previously described, the performance map includes a plurality of cells each containing a subset of the reference data. Whilst there is no limit to the number of cells, it will be appreciated that large numbers of cells can be overwhelming for some types of analysis. In such instances a smaller set of regions is more manageable and enables a simpler analysis of the performance map.

Figure 10:
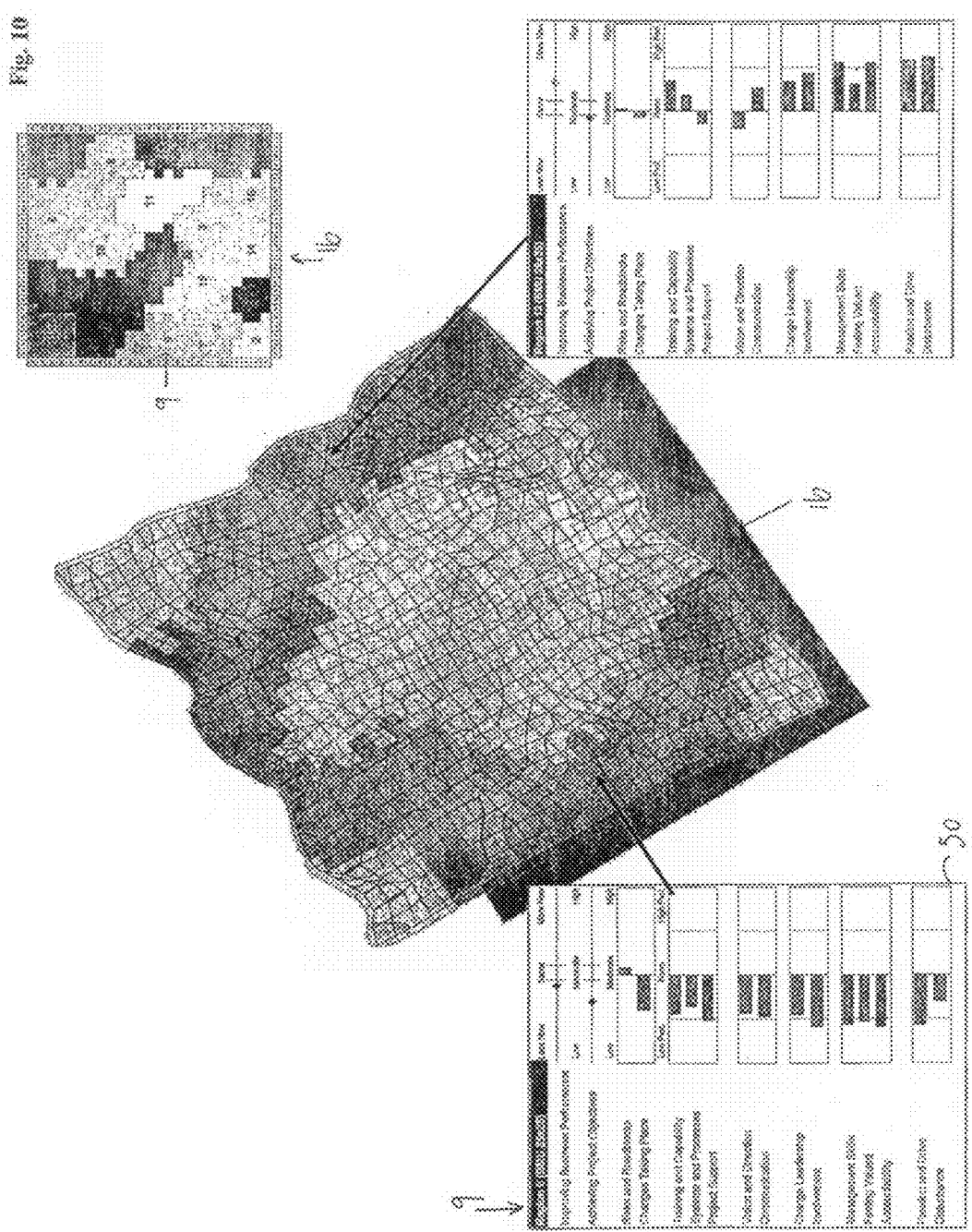
FIG. 10 shows an example of a performance map used in the system of FIG. 1.

FIG. 10 illustrates a performance map 16 having 625 individual cells which are grouped into around twenty regions. The provision of the regions make the analysis a bit more coarse but significantly simplifies the analysis. The cluster of cells within each region are not necessary of equal size. Each of the regions has a distinct driver profile and each differs on the combination of each driver. For example region nine (9) can be mined 50 to understand the strength of the respective drivers. As is illustrated, the drivers for project support, involvement, management skills, accountability and passion and drive are rated highly relative to the driver for risks and roadblocks.

The system 10, as illustrated in FIG. 1 can also be used to map the culture of an organisation. Similarly to what has been described above in relation to FIGS. 1 to 7, when an organisation wants to map the particular culture of the organisation, client specific questionnaires are generated for individuals and teams or groups within the organisation, asking questions such as "overall, how would you rate the way we do things within our division?" Client specific data is then obtained.

Figure 11:
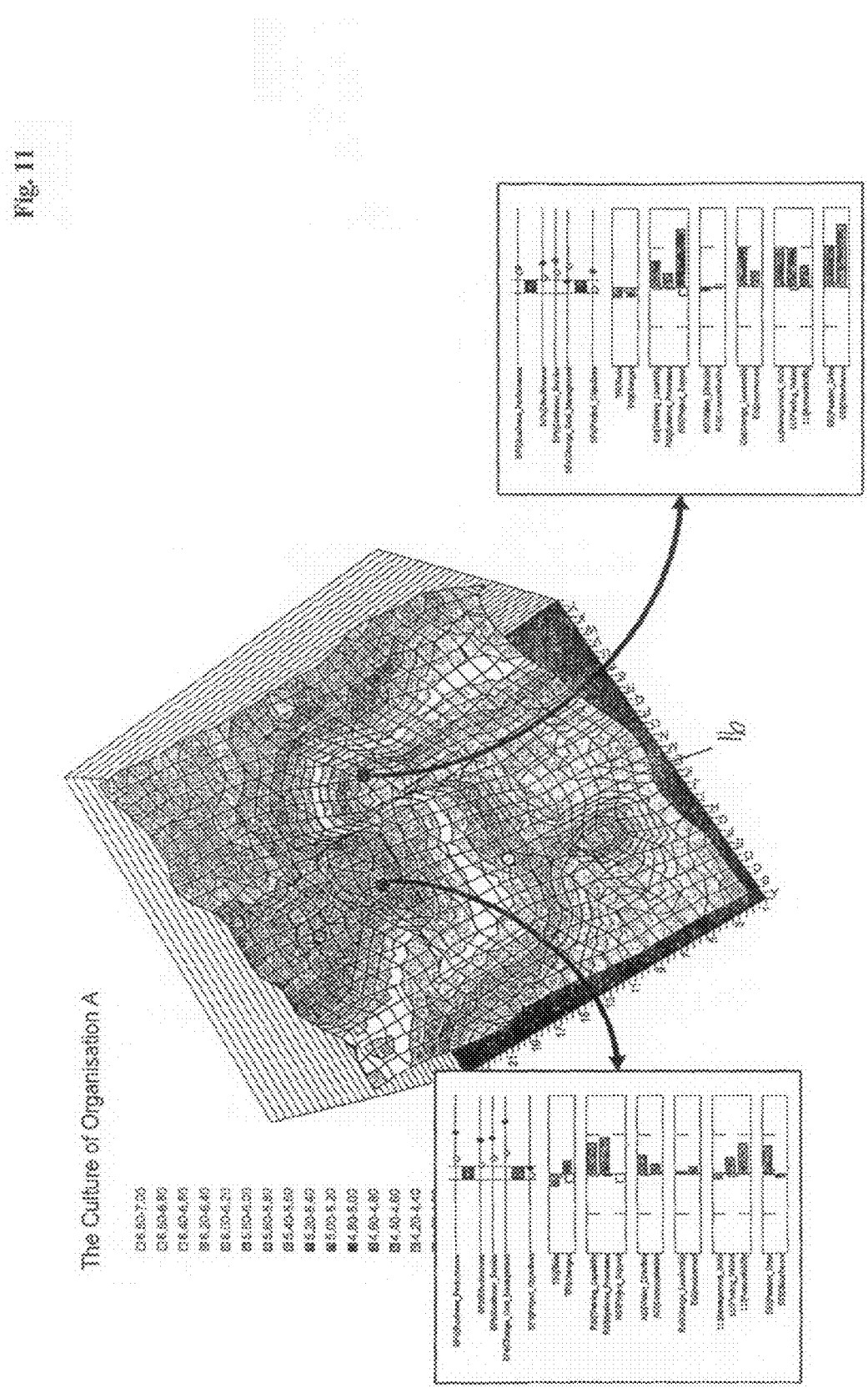
FIG. 11 shows an example of a culture mapping tool output by the system.

FIG. 11 illustrates the mapping of the culture of organisation A. Each individual and group/team is located on the master performance map 16, as described in earlier examples. A 3d plane is created to represent the organisation's culture, with high points on the plane showing areas where the culture of the organisation is strong and low areas where the culture is not prevalent. The change tracking model 40 is then used to isolate areas that correspond with strong culture. By analysing the profile of these cells, driver scores needed to achieve a strong culture are identifiable. In addition, data is able to be collected at regular intervals and located on the master performance map to enable managers to understand how the strength of the culture is changing over time.

In addition, key performance indicator data (KPI data) for each individual and/or group can be overlain to show the compatibility of KPI's with the culture that an organisation is trying to promote.

Figure 12:
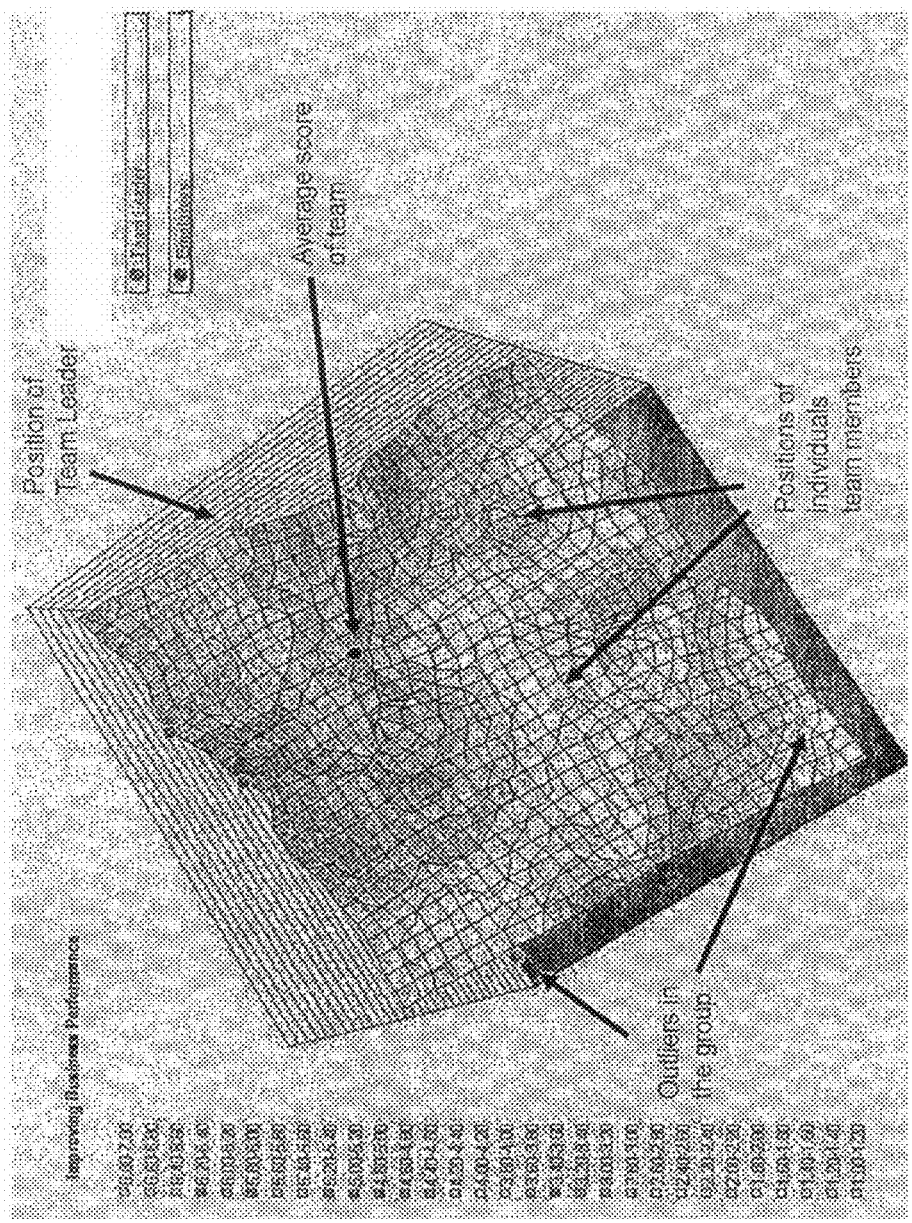
FIG. 12 shows an example of a 3d model which maps the relative positions of individuals and teams within an organisation.

As is illustrated in FIG. 12, the system 10, illustrated in FIG. 1 can be used to locate the relative positions of individuals and groups within an organisation. This provides the organisation with significantly more information with which to construct actions to enhance the performance of the individual of the group. Using the position of an individual placing's on the performance map 16, it can be seen whether the team members are generally in agreement with each other by clustering together on the performance map, or if they disagree with each other by their respective placements on distant parts of the map. As will be appreciated, the unity of a team can be important in producing particular actions. The disunity of the team may only be created by a small number of people who are distinctly different from the main nucleus, or average score, of the team which is concentrated elsewhere. Accordingly, outliers are able to be identified and appropriate actions identified to align the individual with that of the team. Furthermore leaders and managers are able to be positioned in relation to team members. When there a great difference between the team leader and the team itself, it can show the team that there is disconnection with the leadership. Using pattern recognition, the spread of the team can be identified with profiled combinations that show what the performance of the team is likely to be, what actions are needed and what problems might arise.

Figure 13:
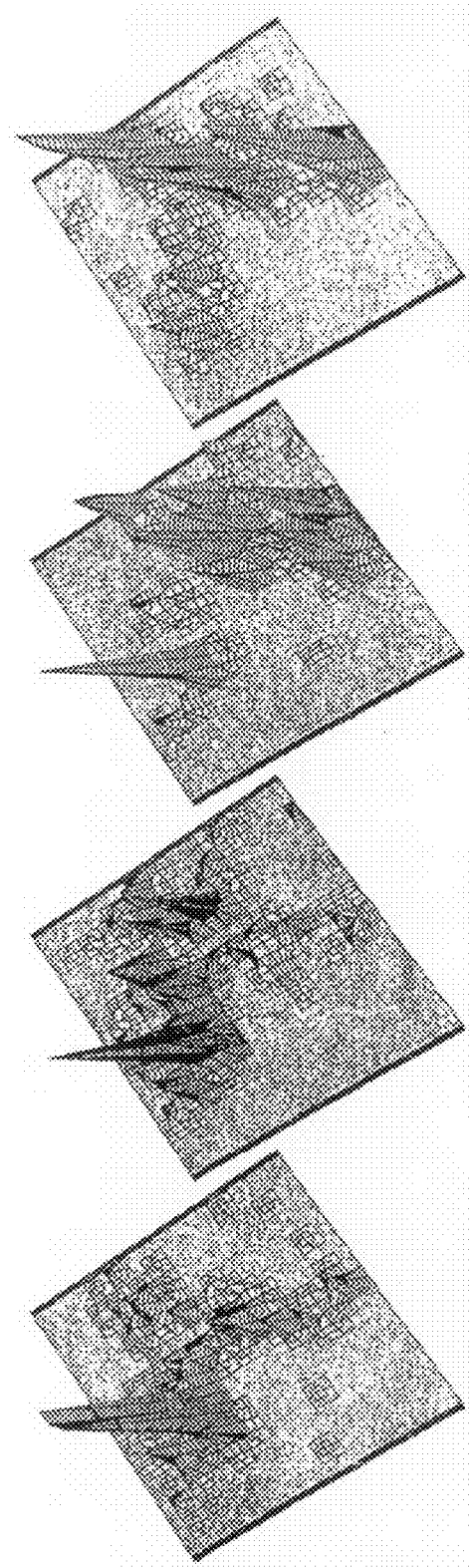
FIG. 13 shows an example of a 3d model which maps the relative positions of teams within an organisation and illustrates the change in culture of that organisation over time.

FIG. 13 shows an example of a 3d model which maps the relative positions of teams within an organisation. In particular FIG. 13 illustrates the change in culture of that organisation over a period from March 2001 (CT1) to August 2004 (CT4). With regard to each of the graphs, the vertical axis represents the number of teams located within particular cells. The change in pattern across time shows the movement in team distribution, or in other words, the change in culture and performance of the organisation throughout time.

It is envisioned that by collecting data and mapping data at regular intervals, a library of all teams and their associated insights and actions will enable more effective navigation of each team through change.

Similar to culture mapping, it is possible to map KPI data on the performance map. By identifying the cells for groups on the performance map and associating their KPI data to that cell, a database over time builds up of cost, occupational health and safety and other KPI data for each cell. Using the KPI data, a 3d plane can be developed which shows the areas of good performance on KPI data and poor performance on KPI data. When an organisation wishes to benchmark around a specified KPI, it is possible to use the top areas of KPI performance as the top benchmark, and the lowest areas of KPI performance as the low benchmark. Change tracking reports are then able to be configured around these benchmarks to show groups how they are performing against real performance.

It should be appreciated that whilst the performance map illustrated in FIG. 3 represents a matrix where a left, top corner of the matrix shows a high performance area and a right, bottom corner shows a low performance area, the cells can be hierarchically ordered in a different manner. For instance, cells within the matrix can be sequenced to read left to right along a row of the matrix, or top to bottom down a column of the matrix, each respectively corresponding to the path from high performance to low performance. Visual identification of the desired performance path may be more readily determined, particularly when grids of around 625 cells are used.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

The invention claimed is:

1. A method of assessing a state of a business entity, the method comprising:
  generating entity data for the business entity to be analysed, the entity data including a plurality of entity variables applicable to the business entity and the variables comprising a plurality of entity drivers;
  deriving reference data from a processor-based analysis engine which performs cluster analysis on source data extracted from a database, the source data relating to a state of a community of which the business entity forms a part and the source data relating to a plurality of community variables, the community variables comprising a plurality of community drivers;
  inputting the entity data into an analytical tool, the analytical tool comprising an array of cells, each cell containing a subset of the reference data, the reference data within each cell providing a measure of each community driver and the arrangement of the cells relative to one another being governed by the inter-relationship of the reference data contained in the cells;
  using the analytical tool to compare the entity data with the reference data to position the business entity in that cell of the analytical tool where the values of the subset of reference data most closely matches the entity variables and to transform the entity data into output data; and producing a performance map containing the output data and using a position of the business entity on the performance map to form a result which is used to analyse the business entity to assess and manage change in the business entity by comparing the output data with the reference data.

2. The method according to claim 1, where the analytical tool is implemented as a two dimensional matrix of the reference data.

3. The method according to claim 1, where the analytical tool is a two dimensional representation of a three dimensional mapping.

4. The method according to claim 3, where the reference data is three dimensionally modelled to provide the three dimensional mapping.

5. The method according to claim 1, where analysing the entity comprises using the output data to show how changing a driver may affect the entity.

6. The method according to claim 1, further comprising implementing a developmental model from the output data to determine how one of change and actions within the entity may affect the entity.

7. The method according to claim 1, further comprising implementing a developmental model from the output data to improve the performance of the entity and to determine how best to achieve a higher level of performance.

8. The method according to claim 1, further comprising generating a report using the output data, the report including at least one of change modelling, dynamic benchmarking, performance mapping, path optimisation, individual reporting, positioning of objectives and obstacles, positioning of individuals and teams within an organisation and culture mapping.

9. A system for assessing a state of a business entity, the system comprising:

a database containing source data relating to a state of a community of which the business entity forms a part, the source data relating to a plurality of community variables and the variables comprising a plurality of community drivers;

an analysis engine for performing cluster analysis on the source data to transform the source data into reference data related to the state of the community, the analysis engine comprising a processor-based data analysis and organisation mechanism for analysing, organising and structuring the reference data into an analytical tool into which entity data obtained from the business entity is input to be analysed, wherein the analytical tool comprises an array of cells, each cell containing a subset of the reference data, the reference data within each cell providing a measure of each driver related to the state of the community and the arrangement of the cells relative to one another being governed by the inter-relationship of the reference data contained in the cells;

a data generator which generates the entity data for the business entity to be analysed, the entity data including a plurality of entity variables applicable to the business entity and the entity variables comprising a plurality of entity drivers, the analytical tool being configured to compare the input entity data with the reference data to position the business entity in that cell of the analytical tool where the values of the subset of reference data most closely match the entity variables to transform the entity data into output data; and a performance map containing the output data and on which the business entity is located, the position of the business entity on the performance map being used to form a result to be used in an analysis of the business entity for assessing and managing change in the business entity by comparing the output data with the reference data.

10. The system according to claim 9, where the analytical tool is implemented as a two dimensional matrix of the reference data.

11. The system according to claim 9, where the analytical tool is a two dimensional representation of a three dimensional mapping.

12. The system according to claim 11, where the reference data is three dimensionally modelled to provide the three dimensional mapping.

13. The system according to claim 9, where the output data set is used to show how changing a driver may affect the entity.

14. The system according to claim 9, where a developmental model is implemented from the output data set for determining how at least one of change and actions within the entity may affect the entity.

15. The system according to claim 14, where the developmental model is used to improve the performance of the entity and to determine how best to achieve a higher level of performance.

16. The system according to claim 9, where the output data set provides the basis for output reporting which includes at least one of change modelling, dynamic benchmarking, performance mapping, path optimisation, individual reporting, positioning of objectives and obstacles, positioning of individuals and teams within an organisation and culture mapping.

17. The system according to claim 16, where dynamic benchmarking comprises normalising the entity data relative to the array of output data and using the normalised data to formulate dynamic benchmarks.

18. The system according to claim 16, where path optimisation comprises outlining a sequence of actions for at least a subset of the entity to reach a higher level of performance.

19. The system according to claim 9, where the subset is an individual within the entity.

20. The system according to claim 9, where the subset is a team, workgroup or business unit within the entity.

21. The system according to claim 9, where the output data set is provided via at least one of the Internet and on a computer readable medium.

22. The system according to claim 9, where the entity variables are selected from the group consisting of performance success factors, change factors, people factors, improving business performance, achieving project objectives and combinations of the foregoing.

23. The system according to claim 22, where the entity drivers relating to performance success factors include at least one of an organisation's effectiveness, competitive position, customer service, ability to deliver innovation, cooperation synergy, morale, and budget constraints.

24. The system according to claim 22, where the entity drivers relating to change factors include at least one of an organisation's growth, restructure, impact of marketplace conditions, levels of resources, extent of training received, and pace and stage of change.

25. The system according to claim 22, where the entity drivers relating to people factors include at least one of an organisation's aligned direction, engagement, team leadership, and learning and emotional energy.

26. The system according to claim 22, where the entity drivers relating to the entity variables of improving business performance and achieving project objectives include at least one of the extent of turbulence within an organisation, the extent of resources within an organisation, aligned direction, engagement, team leadership and emotional energy.

27. The system according to claim 9, where at least one of the entity drivers has sub-drivers representative of at least one of behaviours and measures.

* * * * *